US008176086B2

(12) United States Patent
John et al.

(10) Patent No.: US 8,176,086 B2
(45) Date of Patent: May 8, 2012

(54) METHODS AND APPARATUS FOR DETERMINING A PRESENCE OF A USER

(75) Inventors: Ajita John, Holmdel, NJ (US); Reinhard P. Klemm, Basking Ridge, NJ (US); Doree D. Seligmann, New York, NY (US); Xueshan Shan, Milpitas, CA (US)

(73) Assignee: Avaya Inc., Basking Ridge, NJ (US)

( * ) Notice: Subject to any disclaimer, the term of this patent is extended or adjusted under 35 U.S.C. 154(b) by 194 days.

(21) Appl. No.: 10/999,901

(22) Filed: Nov. 30, 2004

(65) Prior Publication Data

US 2006/0117050 A1    Jun. 1, 2006

(51) Int. Cl.
G06F 17/30 (2006.01)
G06F 15/16 (2006.01)

(52) U.S. Cl. ......... 707/802; 709/206; 709/227; 709/228

(58) Field of Classification Search ............... 707/104.1, 707/101, 802; 709/206, 270, 227, 228
See application file for complete search history.

(56) References Cited

U.S. PATENT DOCUMENTS

| | | | |
|---|---|---|---|
| 6,463,471 B1 * | 10/2002 | Dreke et al. .................. 709/224 |
| 6,658,095 B1 * | 12/2003 | Yoakum et al. ............. 379/93.01 |
| 6,807,423 B1 * | 10/2004 | Armstrong et al. ........... 455/440 |
| 6,822,945 B2 * | 11/2004 | Petrovykh .................... 370/270 |
| 6,987,847 B1 * | 1/2006 | Murphy et al. ............. 379/201.1 |
| 7,107,312 B2 | 9/2006 | Hackbarth et al. |
| 7,143,356 B1 * | 11/2006 | Shafrir et al. ................. 715/751 |
| 7,171,473 B1 | 1/2007 | Eftis et al. |
| 7,233,933 B2 | 6/2007 | Horvitz et al. |
| 7,242,421 B2 | 7/2007 | Center, Jr. et al. |
| 7,248,677 B2 * | 7/2007 | Randall et al. ............. 379/93.23 |
| 7,263,545 B2 | 8/2007 | Digate et al. |
| 7,299,257 B2 | 11/2007 | Boyer et al. |
| 7,523,191 B1 * | 4/2009 | Thomas et al. ................ 709/224 |
| 2002/0035605 A1 * | 3/2002 | McDowell et al. ........... 709/206 |
| 2002/0083127 A1 * | 6/2002 | Agrawal ....................... 709/203 |
| 2002/0097856 A1 * | 7/2002 | Wullert, II ................ 379/201.01 |

(Continued)

FOREIGN PATENT DOCUMENTS

EP    1248484 A1    10/2002

(Continued)

OTHER PUBLICATIONS

Landis, Sean, et al., "Reaching Out to the Cell Phone with JINI", Proceedings of the 35th Hawaii International Conference on System Sciences, Jan. 7-10, 2002, pp. 3821-3830.*

(Continued)

Primary Examiner — Robert Stevens

(57) ABSTRACT

Methods and apparatus are disclosed for collecting presence information about a user from one or more presence sources associated with the user, such as applications, devices and locations. A presence agent is associated with each presence source; and the presence agents provide presence information to one or more presence servers. Typically, the presence agents execute on a processor associated with the corresponding presence source. The presence agent reports one or more of macropresence events and micropresence events. The presence agent optionally prompts the user to update the presence information based on one or more criteria, such as exceeding a time threshold since the last presence event. Continuous presence functions are generated for each presence source that characterize the likelihood of the user to be present on the corresponding presence source at a given time.

27 Claims, 6 Drawing Sheets

U.S. PATENT DOCUMENTS

| | | | |
|---|---|---|---|
| 2002/0163572 A1 | 11/2002 | Center, Jr. et al. | |
| 2003/0014491 A1* | 1/2003 | Horvitz et al. | 709/206 |
| 2003/0018704 A1 | 1/2003 | Polychronidis et al. | |
| 2003/0037103 A1* | 2/2003 | Salmi et al. | 709/203 |
| 2003/0041101 A1* | 2/2003 | Hansche et al. | 709/203 |
| 2003/0046421 A1* | 3/2003 | Horvitz et al. | 709/238 |
| 2003/0053420 A1* | 3/2003 | Duckett et al. | 370/252 |
| 2003/0069934 A1 | 4/2003 | Garcia-Martin et al. | |
| 2003/0073440 A1* | 4/2003 | Mukherjee et al. | 455/435 |
| 2003/0130953 A1 | 7/2003 | Narasimhan et al. | |
| 2003/0135624 A1* | 7/2003 | McKinnon et al. | 709/228 |
| 2003/0154293 A1* | 8/2003 | Zmolek | 709/228 |
| 2003/0182394 A1* | 9/2003 | Ryngler et al. | 709/217 |
| 2003/0217096 A1* | 11/2003 | McKelvie et al. | 709/202 |
| 2003/0217098 A1* | 11/2003 | Bobde et al. | 709/202 |
| 2003/0217142 A1* | 11/2003 | Bobde et al. | 709/224 |
| 2004/0003042 A1 | 1/2004 | Horvitz et al. | |
| 2004/0059781 A1* | 3/2004 | Yoakum et al. | 709/204 |
| 2004/0064585 A1* | 4/2004 | Doss et al. | 709/246 |
| 2004/0083282 A1 | 4/2004 | Shiga et al. | |
| 2004/0122896 A1 | 6/2004 | Gourraud | |
| 2004/0122901 A1* | 6/2004 | Sylvain | 709/206 |
| 2004/0122977 A1 | 6/2004 | Moran et al. | |
| 2004/0128391 A1* | 7/2004 | Patzer et al. | 709/228 |
| 2004/0162881 A1* | 8/2004 | Digate et al. | 709/206 |
| 2004/0172481 A1* | 9/2004 | Engstrom | 709/239 |
| 2004/0199663 A1* | 10/2004 | Horvitz et al. | 709/238 |
| 2004/0205175 A1* | 10/2004 | Kammerer | 709/223 |
| 2004/0225524 A1* | 11/2004 | Narasimhan et al. | 705/1 |
| 2004/0240450 A1* | 12/2004 | Turcanu et al. | 370/395.2 |
| 2004/0249776 A1* | 12/2004 | Horvitz et al. | 706/21 |
| 2004/0267887 A1* | 12/2004 | Berger et al. | 709/206 |
| 2005/0021485 A1* | 1/2005 | Nodelman et al. | 706/21 |
| 2005/0080848 A1* | 4/2005 | Shah | 709/204 |
| 2005/0086270 A1 | 4/2005 | Shimizu et al. | |
| 2005/0169446 A1* | 8/2005 | Randall et al. | 379/93.23 |
| 2005/0198321 A1* | 9/2005 | Blohm | 709/228 |
| 2005/0210148 A1* | 9/2005 | Kato et al. | 709/244 |
| 2005/0228895 A1* | 10/2005 | Karunamurthy et al. | 709/229 |
| 2005/0246421 A1* | 11/2005 | Moore et al. | 709/204 |
| 2006/0002532 A1* | 1/2006 | Horvitz et al. | 379/112.01 |
| 2006/0003740 A1 | 1/2006 | Munje | |
| 2006/0031293 A1* | 2/2006 | Thommes et al. | 709/204 |
| 2006/0075091 A1* | 4/2006 | Beyda et al. | 709/224 |
| 2006/0117050 A1 | 6/2006 | John et al. | |
| 2006/0155733 A1* | 7/2006 | John et al. | 707/101 |
| 2007/0011039 A1* | 1/2007 | Oddo | 705/10 |
| 2007/0180122 A1* | 8/2007 | Barrett | 709/227 |

FOREIGN PATENT DOCUMENTS

| | | | |
|---|---|---|---|
| WO | WO 02/17602 A1 * | 2/2002 | |
| WO | WO 02/43351 A2 * | 5/2002 | |

OTHER PUBLICATIONS

Debaty, Philippe, et al., "Uniform Web Presence Architecture for People, Places and Things", IEEE Personal Communications, vol. 8, Issue 4, Aug. 2001, pp. 46-51.*

Kindberg, Tim, et al., "People, Places, Things: Web Presence for the Real World", Mobile Networks and Applications, vol. 7, No. 5, Oct. 2002, pp. 365-376.*

Perttunen, Mikko, et al., "Inferring Presence in a Context-Aware Instant Messaging System", Lecture Notes in Computer Science, vol. 3283/2004, Nov. 3, 2004, pp. 160-174.*

The American Heritage College Dictionary, 4th Edition, Houghton Mifflin Co., Boston, MA, © 2002, p. 1123.*

Fogarty, James, et al., "Presence versus Availability: The Design and Evaluation of a Context-Aware Communication Client", International Journal of Human-Computer Studies, vol. 61, No. 3, Sep. 2004, pp. 299-317.*

Pusara, Maja, et al., "User Re-Authentication via Mouse Movements", VizSEC/DMSEC '04, Washington, DC, Oct. 29, 2004, pp. 1-8.*

Oliveira, Manuel, et al., "What Online Gamers Really Think of the Internet?", NetGames '03, Redwood City, CA, May 22-23, 2003, pp. 185-193.*

Milewski, Allen E., et al., "Providing Presence Cues to Telephone Users", CSCW '00, Philadelphia, PA, Dec. 2-6, 2000, pp. 89-96.*

Morán, Alberto L., et al., "Document Presence notification Services for Collaborative writing", CRIWG 2001, Darmstadt, Germany, Sep. 1-8, 2001, pp. 125-133.*

Perttunen, Mikko, et al., "Inferring Presence in a Context-Aware Instant Messaging System", INTELLCOMM 2004 (LNCS 3283/2004), Bangkok, Thailand, Nov. 23-26, 2004, pp. 160-174.*

Horvitz et al, "Coordinate: Probabilistic Forecasting of Presence and Availability." Proceedings of the Eighteenth Conference on Uncertainty and Artificial Intelligence pp. 224-233 Edmonton Alberta, Jul. 2002.

Munoz et al., "Context-Aware Mobile Communication in Hospitals", "Computer", Sep. 2003, pp. 38-46, vol. 36, No. 9, Publisher: IEEE Computer Society, Published in: US, 9 pages.

Akkawi et al., "A Mobile Gaming Platform for the IMS", 2004, pp. 77-84, Publisher: SIGCOMM '04, Aug. 30 & Sep. 3, 2004, Published in: Portland, OR, 8 pages.

Debbabi et al., "The War of Presence and Instant Messaging: Right Protocols and APIs", 2004, pp. 341-346, Publisher: CNCC 2004, Jan. 5-8, 2004, Published in: Las Vegas, NV, 6 pages.

Hibino et al., "HandiMessenger: Awareness-Enhanced Universal Communication for Mobile Users","Mobile HCI 2002, LNCS 2411", 2002, pp. 170-183, Publisher: Springer-Verlag Berlin Heidelberg.

"U.S. Appl. No. 10/999,902 Office Action Nov. 27, 2009", , Publisher: USPTO, Published in: US, 29 Pages.

"U.S. Appl. No. 10/999,902 Office Action Feb. 22, 2008", , Publisher: USPTO, Published in: US, 31 Pages.

"U.S. Appl. No. 10/999,902 Office Action Feb. 23, 2007", , Publisher: USPTO, Published in: US, 19 Pages.

"U.S. Appl. No. 10/999,902 Office Action May 21, 2009", , Publisher: USPTO, Published in: US, 37 Pages.

"U.S. Appl. No. 10/999,902 Office Action Aug. 9, 2007", , Publisher: USPTO, Published in: US, 20 Pages.

"U.S. Appl. No. 10/999,902 Office Action Sep. 18, 2008", , Publisher: USPTO, Published in: US, 23 Pages.

"U.S. Appl. No. 10/999,902 Panel Decision Jan. 13, 2010", , Publisher: USPTO, Published in: US, 2 Pages.

"U.S. Appl. No. 10/999,902 Panel Decision Jun. 4, 2010", , Publisher: USPTO, Published in: US, 2 Pages.

* cited by examiner

PRESENCE/AVAILABILITY LEVELS CELL PHONE

PRESENCE/AVAILABILITY LEVELS IM CLIENT

FIG. 7

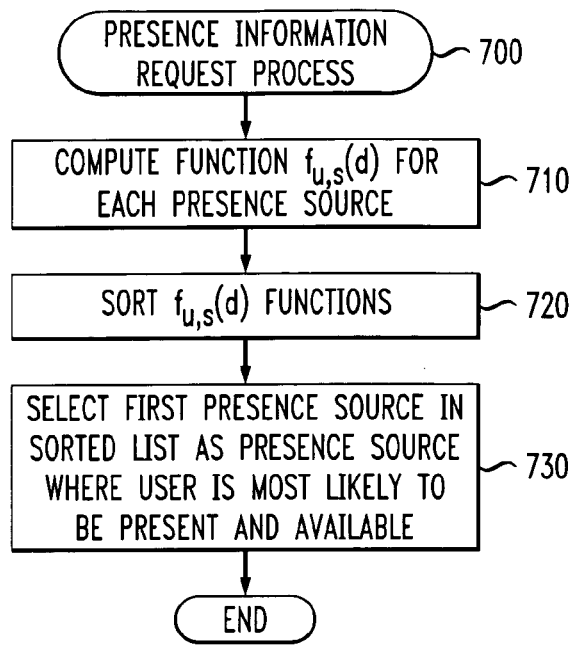

PRESENCE INFORMATION REQUEST PROCESS — 700

↓

COMPUTE FUNCTION $f_{u,s}(d)$ FOR EACH PRESENCE SOURCE — 710

↓

SORT $f_{u,s}(d)$ FUNCTIONS — 720

↓

SELECT FIRST PRESENCE SOURCE IN SORTED LIST AS PRESENCE SOURCE WHERE USER IS MOST LIKELY TO BE PRESENT AND AVAILABLE — 730

↓

END

FIG. 8

DATABASE TRIGGER DATABASE – 800

| TRIGGER EVENT DESCRIPTION (820) | CONDITION(S) (830) | ACTION (840) |
|---|---|---|
| 801 — OPENING OF LOAN RECORD FOR USER X | LOAN RECORD HAS STATUS "PENDING" | NOTIFY USER X'S PROXY PRESENCE AGENT FOR THIS SOURCE |
| 802 — ACCESS OF USER X'S LOAN RECORD | LOAN RECORD HAS CHANGE IN STATUS | NOTIFY USER X'S PROXY PRESENCE AGENT OF STATUS CHANGE |
| ⋮ | ⋮ | ⋮ |
| 805 — APPRAISAL IS RECORDED FOR PROPERTY RELATED TO LOAN | APPRAISAL AMOUNT EXCEEDS MINIMUM REQUIREMENT | NOTIFY USER X'S PROXY PRESENCE AGENT OF SUCCESSFUL APPRAISAL |

METHODS AND APPARATUS FOR DETERMINING A PRESENCE OF A USER

CROSS-REFERENCE TO RELATED APPLICATION

The present application is related to U.S. patent application, entitled "Methods and Apparatus for Determining a Proxy Presence of a User," application Ser. No. 10/999,902, filed contemporaneously herewith and incorporated by reference herein.

FIELD OF THE INVENTION

The present invention relates generally to communication methods and systems, and more particularly, to methods and systems that determine the presence of a user based on multiple sources of presence information.

BACKGROUND OF THE INVENTION

A number of techniques have been proposed or suggested for determining whether or not a person is "present" at a given device, location or application. Presence information is becoming increasingly important for many applications. For example, as friends and colleagues become more distributed in time or location (or both), it becomes even more desirable for a user to determine, prior to a given communication attempt, whether or not the intended recipient of the contemplated communication is currently available at one or more communication devices. The provided presence information allows a user to make a more informed decision about how to best communicate with another person. In this manner, productivity is enhanced by enabling a better selection of the best way to contact the other person. This informed choice leads to a more efficient, productive and cost effective communication.

Determining a user's presence and availability at a given device, location or application can generally not be done with certainty. Presence and availability are a prediction of current presence and availability based on presence and availability in the past (i.e., either the immediate past or over an extended history). For example, presence information based on login activity (e.g., whether the user is currently logged on to a given service) can grow stale over time, since a user may remain logged in to an application for several days at a time. Thus, many presence-tracking systems supplement the user login activity with other determinable user activity, such as keyboard or mouse activity and whether a user remains idle for a time period exceeding a specified interval. Existing presence awareness systems can distinguish between a user who is connected to the service (present) or not connected to the service (absent), and most systems allow some sort of busy or unavailable flag to be set.

A number of techniques have been proposed or suggested for evaluating the likelihood that a user will be present at a device or location at some time, t, based on knowledge that the user was present at the device or location at some prior time. Such techniques are sometimes referred to as "presence aging." For example, Horvitz et al., "Coordinate: Probabilistic Forecasting of Presence and Availability," $18^{th}$ Conf. on Uncertainty and Artificial Intelligence, 224-233 (July, 2002), describes a system that attempts to predict a user's presence and availability based on historical data, as well as future known data about the user's activities, for example, from a user's calendar. The Horvitz system attempts to evaluate the probability of the user's presence and availability being associated with one or more discrete presence/availability states.

While existing presence awareness systems provide valuable presence information, they suffer from a number of limitations, which if overcome, could further improve the ability of users to efficiently communicate. For example, existing presence awareness systems are typically proprietary, closed architecture systems that only provide presence information within the domain of the service provider (i.e., one service subscriber can only determine if another service subscriber is present). Moreover, such systems typically require the user to actively perform a system login before these systems can track user presence and availability. In addition, existing presence aging techniques employ discrete stepwise functions that consider a presence state, such as "available," to be in full effect until a certain time interval (or event) has passed, then the presence state changes to another, generally lower, discrete value, such as "away."

A need therefore exists for methods and systems that can evaluate a number of different sources of presence information for a user, independent of the providers of the devices and systems that constitute presence sources and without requiring active user logins, using a presence agent associated with each source of presence information. A further need exists for a method and apparatus for evaluating presence information on a continuous scale.

SUMMARY OF THE INVENTION

Generally, methods and apparatus are provided for collecting presence information about a user from one or more presence sources associated with the user, such as applications, devices and locations. A presence agent is associated with each presence source; and the presence agents provide presence information to one or more presence servers. Typically, the presence agents execute on a processor associated with the corresponding presence source. The presence agent reports one or more of macropresence events and micropresence events. The presence agent optionally prompts the user to update the presence information based on one or more criteria, such as exceeding a time threshold since the last presence event.

According to another aspect of the invention, continuous presence functions are generated for each presence source that characterize the likelihood of the user to be present on the corresponding presence source at a given time. The continuous presence functions are optionally recomputed if a time since a last computation exceeds a threshold.

A more complete understanding of the present invention, as well as further features and advantages of the present invention, will be obtained by reference to the following detailed description and drawings.

BRIEF DESCRIPTION OF THE DRAWINGS

FIG. 7 is a flow chart describing an exemplary implementation of a presence information request process of FIG. 5; and FIG. 8 is a sample table for an exemplary database trigger database that records one or more database triggers that can be used to report presence events to a proxy presence agent of a user.

DETAILED DESCRIPTION

Figure 1:
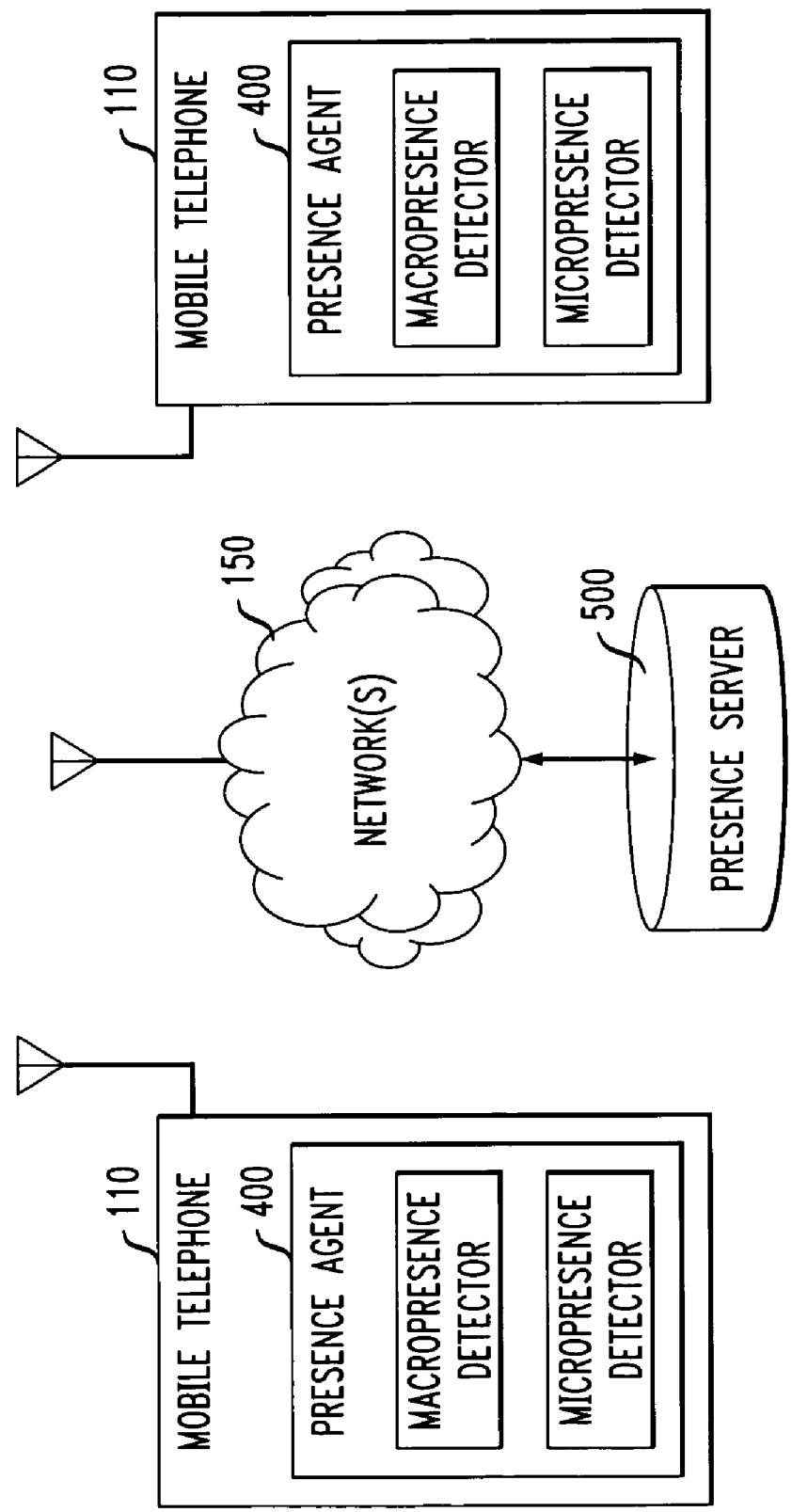
FIG. 1 illustrates a network environment where the present invention can operate.

The present invention provides techniques for approximating the current presence and availability status of a user. FIG. 1 illustrates a network environment 100 where the present invention can operate. As shown in FIG. 1, a number of users communicate over one or more wired or wireless networks 150. In the exemplary embodiment, each user employs a mobile telephone 110. While the present invention is illustrated in the context of mobile telephones 110, the invention may be applied to many other devices and applications, as would be apparent to a person of ordinary skill in the art.

Macropresence

Figure 4:
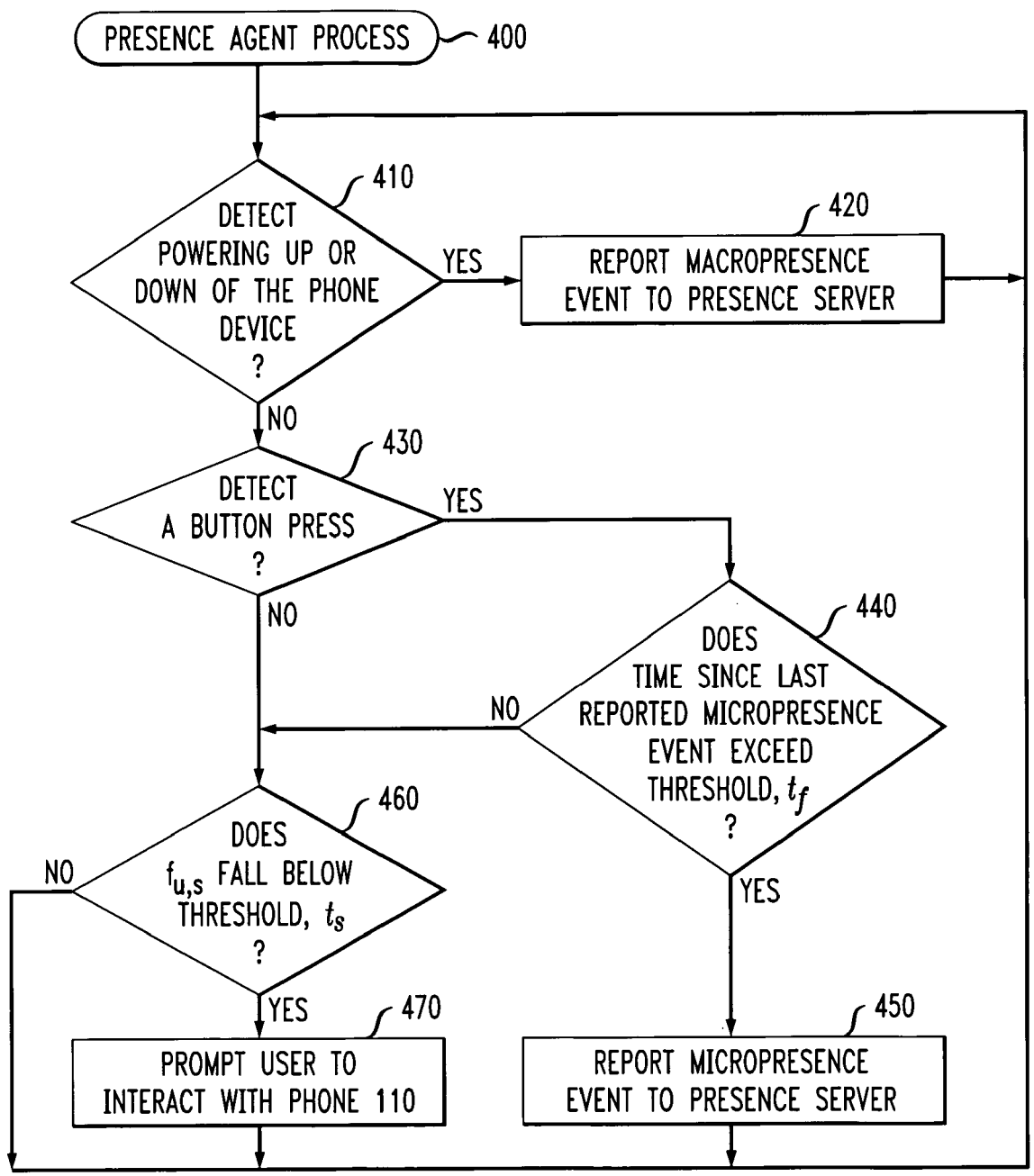
FIG. 4 is a flow chart describing an exemplary implementation of the software agent process of FIG. 1.

According to one aspect of the invention, a software agent 400, discussed below in conjunction with FIG. 4, is deployed on a mobile phone device 110. The software agent 400 automatically reports powering up and down the phone device to a presence server 500, discussed below in conjunction with FIGS. 5 through 7. The interval between the device "on" and "off" events constitutes the phone user's macropresence. Subscribers to this user's macropresence through the presence server 500 can thus be notified when the user turns on or off the phone 110 or of other presence events. In one exemplary implementation, the user of the phone device 110 does not have to invoke any software on the phone 110 nor does the user have to use any software to explicitly propagate macropresence changes to the presence server 500. In other words, there is no effort or intervention required from the user to indicate macropresence changes. Moreover, because this process of reporting macropresence changes to a presence server 500 is automatic, the user cannot forget to indicate or to report a macropresence change.

A presence subscriber, such as applications and other users, may be interested in a user's macropresence as one of potentially many disparate sources of presence information about this user. A subscriber to a user's macropresence might use macropresence to influence the routing of communications to this user. For example, if the macropresence subscriber knows that the user has turned on his or her mobile phone 110, the macropresence subscriber could decide to route a phone call to the user's mobile phone 110 rather than to his or her desk phone or to send an email or instant message to the email/instant message address associated with her mobile phone 110 rather than that associated with their work environment.

In the illustrative embodiment, the software agent 400 is deployed on the mobile phone 110 rather than in the phone provider's network 150. Thus, in such an embodiment, reporting mobile phone macropresence is independent of the provider network 150 and its capabilities. However, there may be situations where it is desirable to have the provider network 150 host the macropresence reporting software, e.g., in cases where mobile phones are not capable of running additional software or where a network provider would like to offer a fee-based macropresence service. In such cases, the phone network provider can offer the same functionality of reporting macropresence by using software in the phone network 150.

Micropresence

The present invention recognizes that mobile phone users tend to leave their mobile phones on for extended periods of time even though they may not be truly available on their mobile phones. For example, mobile phone users might leave their phone in their car while being in a store. A mobile phone user might mute the ringer of the phone while being in a movie theater. In such cases, the user's macropresence cannot be used to accurately infer the availability of the user to receive communications at that time.

Thus, according to another aspect of the invention, micropresence supplements macropresence information with button press events and channel usage information on the mobile phone 110. In between mobile phone "on" and "off" events, there is typically a sequence of button pushes related to user activities such as receiving calls, making calls, checking voice mail, running applications, receiving messages, changing ring tones and modifying the configurations of the phone. The software agent 400 can propagate macropresence changes to the presence server 500, as well as button presses and other user activities.

The accuracy of decisions based on presence information is directly related to how recently a reported macropresence or micropresence event occurred. However, a presence server 500 can be easily overwhelmed with micropresence events if a large number of mobile phones 110 report micropresence events. To prevent flooding of the presence server, the number of micropresence events may be limited by only propagating micropresence events to the presence server 500 from a given mobile phone 110 if no such event has been propagated to the server 500 in the last $t_f$ time units, where $t_f$ is a configurable parameter in the software agent 400. To this end, the software agent 400 keeps track of the time of the last micropresence event that was propagated to the presence server. If the next event falls within $t_f$ time units of the last recorded event, the event will not be propagated to the presence server.

The macropresence and micropresence information collected by the presence agent 400 is independent of the service provider associated with the mobile telephone 110 and independent of the technology employed by the service provider. The presence agent 400, deployed on the mobile telephone 110 itself, can thus provide presence information to any application outside of the realm of the service provider.

In addition, because the presence agent 400 is deployed on the mobile telephone 110 itself, the presence agent 400 has access to all button presses on the telephone 110, whether or not such button presses result in a transmission to the service provider (who only knows of transmitted events). For example, if a user locks or unlocks the telephone 110 or checks a call log, these operations do not result in communications and would not be known to the service provider but would be known to the presence agent 400 (and can be propagated to the presence server).

Presence Aging and Fuzzy Presence

When a subscriber to a user's macropresence and micropresence needs to make a decision based on the user's presence on a device or application or at a location, the last reported macro presence or micropresence event for this user lies in the past. Depending on how long ago the last event of this kind was, it may not be a good indication of what the user's current presence and availability is. This effect is referred to as presence aging.

Another aspect of the invention ranks presence events, originating at all presence event sources including mobile phone macropresence and micropresence, according to the timeliness of presence events. To each element s in the set S(u) of presence event sources for a user, u, a monotonically decreasing and continuous function $f_{u,s}(d)$ is applied as a function of the time difference d between the current time and the last presence event originating at s. The most appropriate function $f_{u,s}$ can be determined based on experimental results. To determine the likeliest device or application or location that a user is present and available at, the function $f_{u,s}$ is computed for each presence source s and the list of computed values is sorted in descending order. The presence source at the top of the list is generally associated with the presence source that the user is likeliest to be present and available at. Evaluation of the function $f_{u,s}$ indicates the user's current level of presence/availability, on a continuous scale, based on the type of presence source and the amount of time that has passed since the last presence event from that presence source (as opposed to a history of past presence events).

As discussed further below, the continuous values of presence/availability levels provided by the present invention allow the presence/availability levels of a user to be aggregated across all presence sources for this user and subsets of a given set of users to be identified with certain presence/availability levels (such as the most available user, the least available user, and the subset of users with a certain minimum or maximum presence/availability level).

The values of $f_{u,s}(d)$ are referred to as fuzzy presence values to distinguish them from the known concept of discrete presence states. The latter are equivalent to using discrete functions with non-numerical values instead of continuous functions. A discrete presence state could be "available" or "away" or "extended away," to use an example from the instant messaging world. The uncertainty about a user's presence status at a presence source is better accounted for by fuzzy presence, i.e., by continuous functions rather than by discrete functions. More importantly, using continuous functions instead of discrete functions with non-numerical values allows computations on presence values to be performed much more easily and efficiently. For example, computing the average or a weighted average for $f_{u,s}$ at all presence sources s at a given point d for a specific user u is trivial and would allow the presence subscriber to easily discern the "overall presence" of this user. Comparing the overall presence values for different users is a potentially very useful exercise.

If a presence subscriber is not interested in determining a specific user's presence but rather in the question of who is the "most" available person f(U) among a set U of users, the presence subscriber could easily compute the following value:

$$f(U) = \max \{f_{u,s}(d) | u \in U, s \in S(u)\}.$$

This concept of the "most" available person may be applied, for example, in a help desk where a dispatcher (a presence subscriber) needs to find the first available help desk person. It is again noted that the use of continuous functions $f_{u,s}$ makes the computation of the function f(U) very simple and efficient.

This concept of the "most" available person may be extrapolated to compute subsets of U with a given minimum or maximum level of presence/availability or subsets that fall into a given interval of presence/availability levels. For example, the subset of U that includes all the users whose presence/availability does not exceed 0.1 and who therefore have to be reminded of the necessity to be more available to customer questions can be identified, for example, for a manager or supervisor. Alternatively, the subsets of all users whose presence/availability level exceeds 0.85 can be identified on behalf of an important customer that needs to speak to an expert in U as quickly as possible.

In order to deal with presence aging, a user could be prompted to interact with the presence source s to confirm and refresh his or her presence and availability status, if the value of the function $f_{u,s}$ falls below a configurable threshold $t_s$. In the case of a mobile phone 110 as the source of macropresence and micropresence events, the software agent 400 that reports macropresence and micropresence events can optionally prompt the user through a visual or acoustic signal to press an arbitrary button if the value of $f_{u,s}$ falls below the threshold $t_s$. The button would count as a micropresence event as described above. The use of fuzzy presence allows fine-grained values to be selected for $t_s$, compared with discrete presence states.

In one exemplary implementation, a user can change, override, or influence the value of $f_{u,s}$ for a given presence source s and at a given point d. Changing the value of $f_{u,s}$ either manually or through a presence application or an application that influences presence values, allows the user to determine or establish how available he or she wants to be to a presence subscriber. A more fine-grained approach would be to adjust the value of $f_{u,s}$ differently for different presence subscribers. For example, users could choose to be 0.9 available for their superior but only 0.3 available for presence subscribers outside their department.

Figure 2:
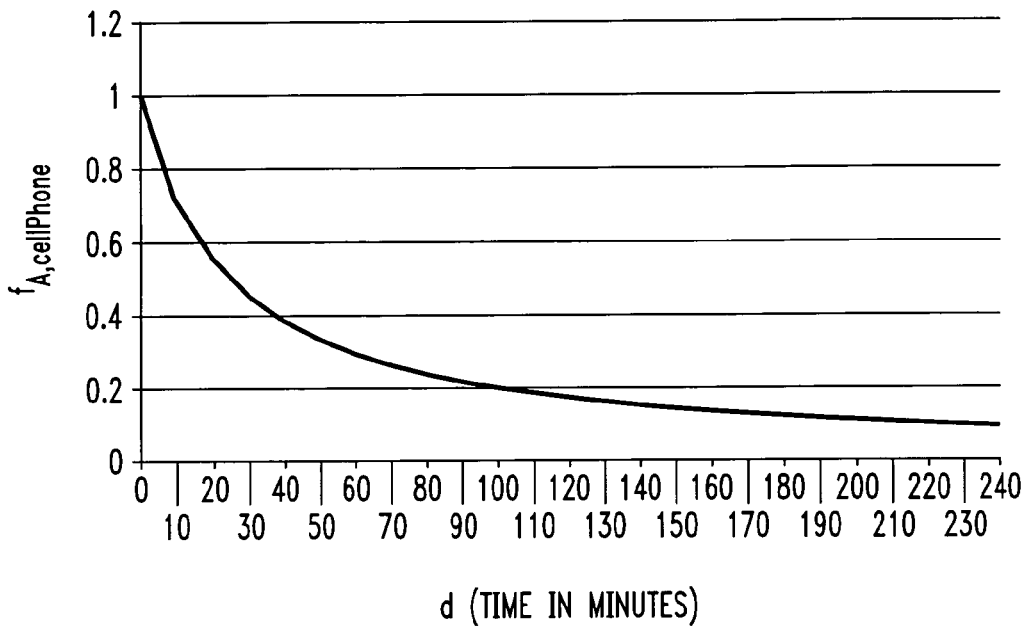
FIGS. 2 and 3 illustrate two exemplary presence functions for different presence sources, s, as a function of a time difference between the current time and earlier presence events.
Figure 3:
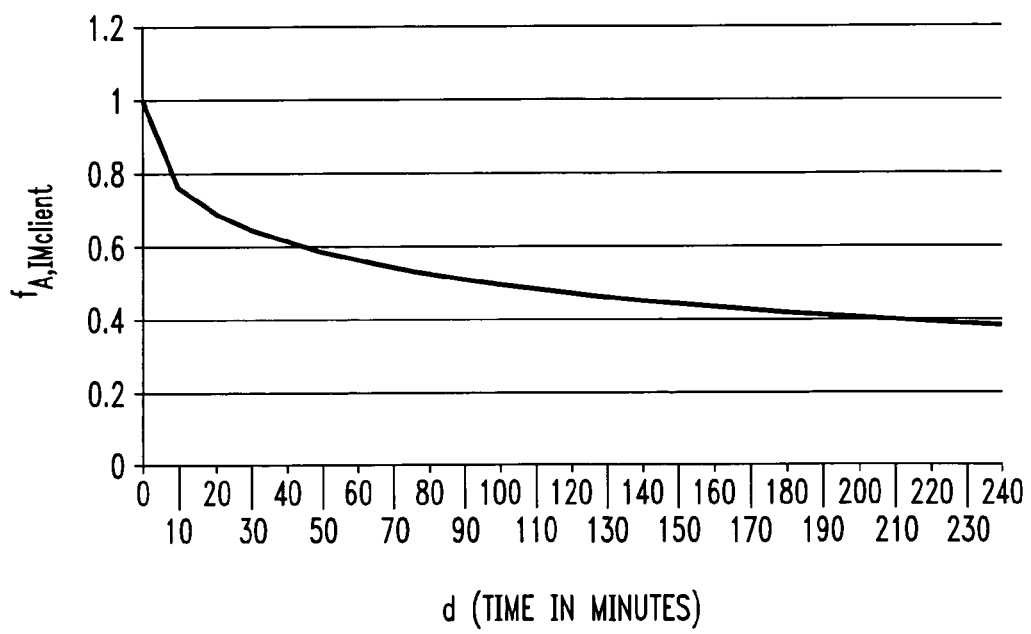

FIGS. 2 and 3 are graphs illustrating two exemplary presence functions for different presence sources, s, as a function of the time difference d between the current time and earlier presence events originating at s. For example, consider a user A having two presence sources, a mobile phone and an IM client, i.e., S equals {cellphone, IMclient}. Two presence functions are defined, $f_{A,cellPhone}$ and $f_{A,IMclient}$, and assume the experience with user A in these two functions reflects that presence levels for user A on the mobile phone decrease more rapidly than presence levels on the IM client. Thus, the exemplary functions are defined as followed:

$$f_{A,cellPhone}(d) = 25/(d+25);$$

and $$f_{A,IMclient}(d) = 10/(\sqrt{d}+10).$$

Suppose A is a member of the universe U of all database experts in an organization and the subscriber to A's presence is an expert locator application that is looking for a database expert at 10:05 AM on a given day. It is assumed that the last time A touched a button on her mobile phone was at time $t_{cellPhone}$ equal to 9:20 AM on the same day and the last time she used her IM client was at time $t_{IMclient}$ equal to 8:35 AM on the same day. Assume further that the presence subscriber in question prefers an expert available on voice over an expert available on IM with a ratio of 2 to 1. Thus, the two functions are assigned weights of ⅔ and ⅓, respectively, to compute the overall availability of each expert. It is noted that the parameters in a weighted function typically add up to 1. This yields the following function:

$$f_{A,overall}(t) = \tfrac{2}{3} * f_{A,cellPhone}(t - t_{cellPhone}) + \tfrac{1}{3} * (t - t_{IMclient}) = 50/(3*(t - t_{cellPhone}) + 75) + 10/(3* \sqrt{t - t_{IMclient}} + 30)$$

At 10:05 AM, the overall presence/availability level of A is therefore 0.4091. If all other experts in U have presence/availability levels lower than 0.4091, then the expert locator application will select A at this time. A's presence level at 10:05 AM is higher on her IM client than her mobile phone according to the functions $f_{A,cellPhone}$ and $f_{A,IMclient}$. The expert locator application might thus try to reach A on her IM client first despite the locator's preference for voice or might indeed try to reach A on her mobile phone first. This discussion, however, is beyond the scope of the presence/availability level computation.

Presence Agent

As previously indicated, the presence agent 400 is a software entity that communicates with the presence server 500 over the network 150. The network connection need not be a direct one, i.e., the data connection does not necessarily terminate at the presence server 500. Intermediaries may be present and the presence agents 400 can connect to the presence server 500, for example, through a gateway or proxy; via a database, shared file, or shared memory from where the presence server 500 picks up presence events from presence agents 400; or via an application that performs some type of preprocessing or filtering on presence events. For the sake of illustration, it is assumed that the presence agent 400 is connected to the presence server 500 without any intermediate proxy or system.

The presence agent 400 can be deployed on any commercially available mobile phone 110 that can execute the presence agent 400 and allow the presence agent 400 to intercept all button presses or can notify the presence agent 400 of button presses. The presence agent 400 can be deployed, for example, on a device 110 that executes the Symbian operating system or another embedded operating system. As previously indicated, an alternate embodiment of the present invention allows the functionality of the presence agent 400 to be implemented on one or more nodes in the network 150.

FIG. 4 is a flow chart describing an exemplary implementation of the software agent process 400. Generally, when the user powers up the mobile phone 110, the software agent 400 is launched automatically and establishes a data connection to the presence server 500. The first exchange of data over this connection indicates to the presence server 500 that the mobile phone 110 has been powered up and includes, for example, the telephone number and potentially other parameters, such as a user name.

The presence agent 400 can strive to maintain the data connection until the user turns off the mobile phone 110 or can tear down the data connection after each data exchange with the presence server 500 and then re-establish the connection before the next data exchange. In the latter case, a periodic data connection re-establishment can optionally be employed even in the absence of presence events on the mobile phone 110, as a heartbeat signal to the presence server 500.

As shown in FIG. 4, a test is performed during step 410 to determine if a powering up or down of the phone device 110 is detected. If it is determined during step 410 that a powering up or down of the phone device 110 has been detected, then the macropresence event is reported to the presence server 500 during step 420.

Similarly, a test is performed during step 430 to determine if a button press is detected. As previously indicated, the presence agent 400 reports button presses and other events on the mobile phone 110 to the presence server 500. The presence agent 400 may include, for example, an indication of the pressed button, as well as the mobile phone's phone number and potentially other parameters in the ensuing data exchange with the presence server 500. As discussed below in conjunction with FIG. 6, the presence server 500 will record the time of the button press in the user's micropresence information. In the special case of the user pressing the power button (to power off the phone), the presence server 500 will also update the macropresence of the user.

In order to prevent flooding the presence server 500 with micropresence presence events from mobile phones 110, the presence agent 400 can optionally propagate button presses or other events related to micropresence only if the last such button press or event was more than $t_f$ time units ago where $t_f$ is a configurable parameter. To this end, the presence agent must store the time $t_l$ of the last macro/micropresence event on the phone.

Thus, if it is determined during step 430 that a button press (or another event) has been detected, then a further test is performed during step 440 to determine if the time, $t_l$, since the last reported micropresence event exceeds the threshold, $t_f$. If it is determined during step 440 that the threshold has not been exceeded then there is no need to report the current micropresence event. If, however, it is determined during step 440 that the threshold has been exceeded then the current micropresence event is reported to the presence server 500 during step 450. In this manner, when a micropresence event occurs, the presence agent 400 compares the current time $t_c$ with $t_l$ and propagates the event to the presence server if the difference between $t_c$ and $t_l$ exceeds the threshold, $t_f$. If $t_f$ is set to zero, the presence agent reports every micropresence event. Setting $t_f$ to zero might be desirable for reporting purposes, advanced queries from presence subscribers, and with few mobile phones 110 connected to the presence server 500.

Presence agents may also periodically recompute the values $f_{u,s}$ with a configurable frequency to determine whether the user must be prompted for a presence and availability status update. A test is thus optionally performed during step 460 to determine if one or more functions $f_{u,s}$ falls below a configured threshold, $t_s$ (i.e., if the value of $f_{u,s}$ at this time is smaller than the configurable threshold $t_s$). If it is determined during step 460 that the value of $f_{u,s}$ falls below the threshold, $t_s$, the presence agent 400 will prompt the user during step 470 for a presence/availability status update.

In an alternate implementation where the presence server 500 requests the prompting, the presence server 500 can monitor the functions $f_{u,s}$ and if the presence server detects that the value of $f_{u,s}$ for a given user u and presence source s has fallen below the configurable threshold $t_s$, the presence server 500 can send a signal to the presence agent 400 connected to the presence source s.

In either implementation, the presence agent 400 can then prompt the user u for a presence and availability update on the presence source s, for example, by playing a sound or displaying a message on the telephone display. The user may respond, for example, by pressing an arbitrary button on the phone 110. The button press constitutes a micropresence event that the presence agent 400 propagates to the presence server 500. If the user does not respond to the prompting, the user can be prompted again. The reprompting should occur with a low frequency $f_p$, for example on the order of tens of minutes. It is noted that if the user does not respond to the prompting, the presence server (or the presence agent, depending on the implementation) will determine with frequency $f_p$ that the value of the function $f_{u,s}$ is below the threshold $t_s$. If the communication overhead of sending prompting signals from the presence server 500 to the agents 400 is considered too high, it is preferred that the agents 400 themselves recompute the values of $f_{u,s}$ and perform the user prompting, when necessary, in the manner shown in FIG. 4. Otherwise, centralized computation of the values of $f_{u,s}$ by the presence server 500 is preferred.

Presence Server

Figure 5:
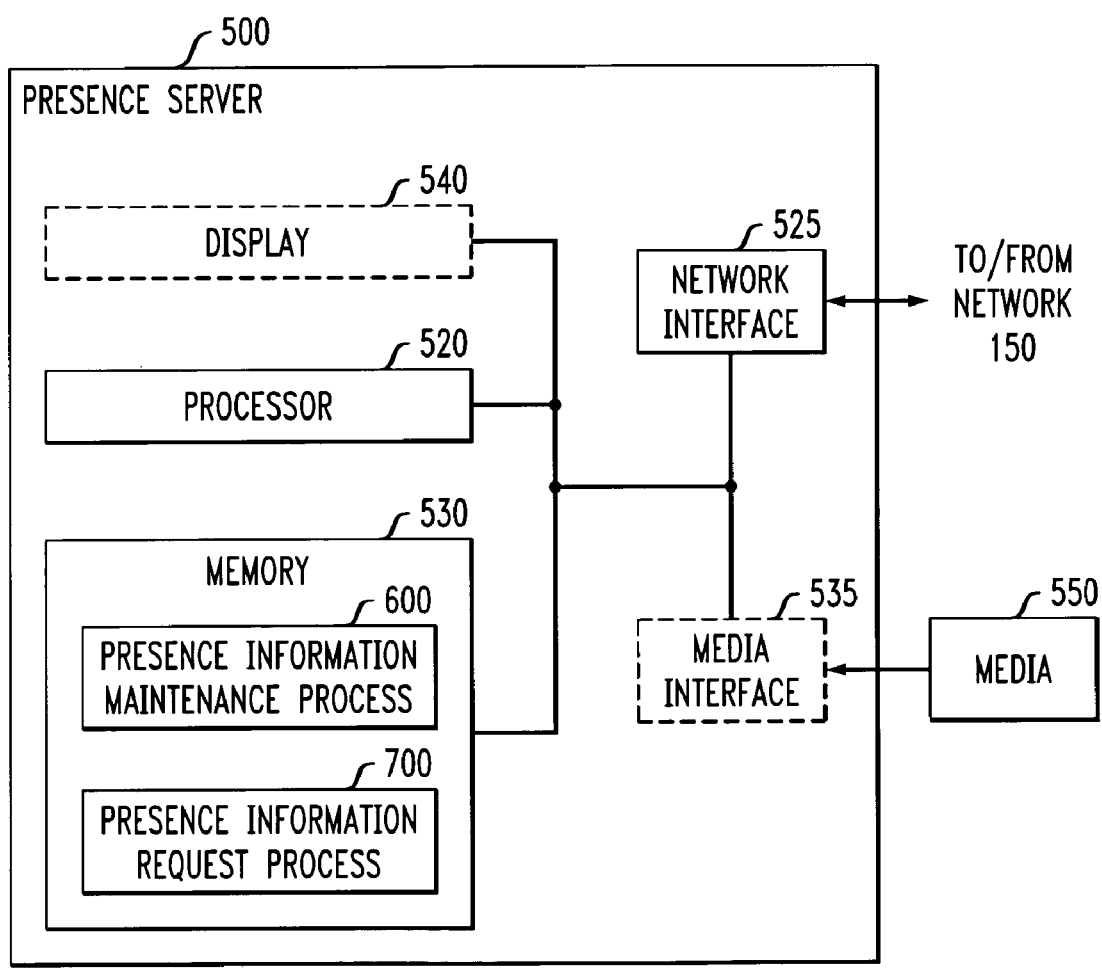
FIG. 5 is a schematic block diagram of an exemplary presence server of FIG. 1.

FIG. 5 is a schematic block diagram of an exemplary presence server 500. The presence server 500 comprises a computer system that optionally interacts with media 550. The presence server 500 comprises a processor 520, a network interface 525, a memory 530, a media interface 535 and an optional display 540. Network interface 525 allows the presence server 500 to connect to the network 150, while media interface 535 optionally allows the presence server 500 to interact with media 550, such as a Digital Versatile Disk (DVD) or a hard drive. Optional video display 540 is any type of video display suitable for interacting with a human user of the presence server 500. Generally, video display 540 is a computer monitor or other similar video display.

As shown in FIG. 5 and discussed further below in conjunction with FIGS. 6 and 7, respectively, the exemplary memory 530 stores a presence information maintenance process 600 and a presence information request process 700. For a discussion of suitable techniques for processing such presence information, see, for example, U.S. patent application Ser. No. 10/672,633, entitled "Method and Apparatus for Delivering a Voice Mail Message With an Indication of the Presence of the Sender," or U.S. patent application Ser. No. 10/672,635, entitled "Programmable Presence Proxy for Determining a Presence Status of a User," each assigned to the assignee of the present invention and incorporated by reference herein.

Figure 6:
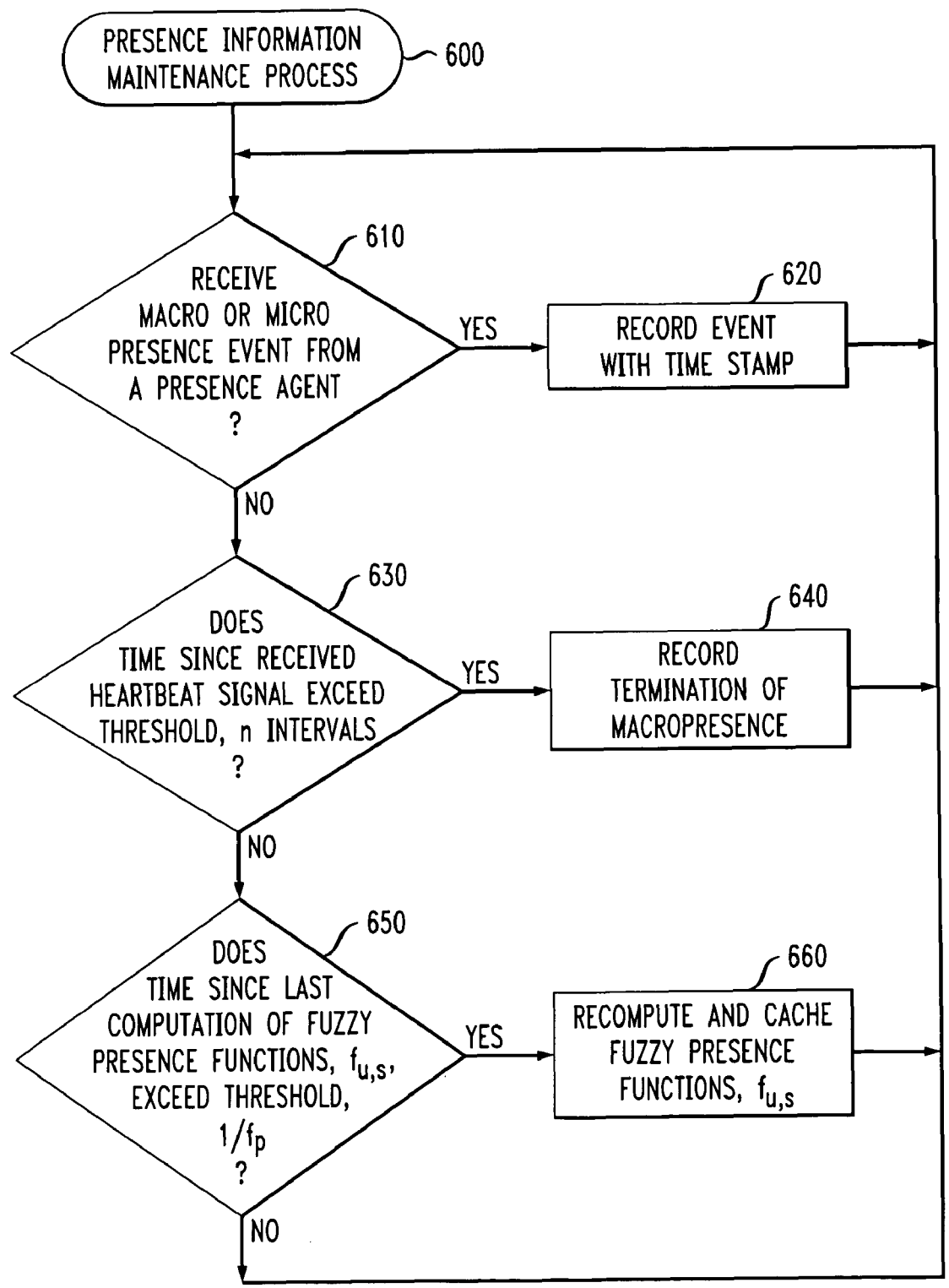
FIG. 6 is a flow chart describing an exemplary implementation of a presence information maintenance process of FIG. 5.

FIG. 6 is a flow chart describing an exemplary implementation of a presence information maintenance process 600 incorporating features of the present invention. As shown in FIG. 6, the presence information maintenance process 600 initially performs a test during step 610 to determine if a macro or micro presence event has been received from a presence agent 400. If it is determined during step 610 that a macro or micro presence event has been received from a presence agent 400, then the event is recorded during step 620 including a time stamp.

A test is performed during step 630 to determine if the time since the last received heartbeat signal exceeds a threshold of n intervals. If the presence server 500 does not receive the heartbeat for n consecutive intervals, where n is a configurable parameter, the presence server 500 will consider the macropresence of this user to have ended during step 640. This heartbeat mechanism addresses situations where the connection is lost due to, for example, dropped mobile phone signals, software errors and hardware problems with the phone (including a drained battery). These are cases where the likelihood is large that the user indeed cannot be reached on his or her mobile phone. In the case of a permanent data connection between the presence agent 400 and the presence server 500, unavailability of the user due to events such as those mentioned above will result in the termination of the data connection, which the presence server 500 can interpret as the end of the macropresence of the user.

A further test is performed during step 650 to determine if the time since the last computation of the fuzzy presence functions, $f_{u,s}$, exceeds a threshold, $1/f_p$. If it is determined during step 650 that the time since the last computation of the fuzzy presence functions, $f_{u,s}$ exceeds the threshold, $1/f_p$, then the fuzzy presence functions, $f_{u,s}$ are recomputed and cached during step 660.

Assuming that there is a high frequency of presence queries against the fuzzy presence values of users, such a periodic recomputation and caching of the fuzzy presence of users can be performed with the configurable frequency of $f_p$ by the presence server 500. Typically, the recomputation will take place no more often than once in a few minutes. For each user, the presence server 500 stores at a minimum the time of the last presence event from that user's mobile phone 110. If storage capacity is not an issue, the type of event ("power on", type of button last pressed, "power off", "missed heartbeat" or "data connection terminated", etc.) should also be stored, as well as a log of past presence events for the purpose of reporting and enabling presence queries that include the history of user presence.

An example of the latter would be "find all users with phone numbers in the 908 area code who were present between 2 PM and 4 PM today and checked their call logs during that time". After each interval of $1/f_p$ time units, the presence server 500 recomputes $f_{u,s}$ for each user u and each of u's presence sources s using the difference between the current time and the time of the last presence event from s for u as the input for $f_{u,s}$.

Additional computations such as that of f(U) that aggregate values of $f_{u,s}$ for different presence sources and users, in the manner described above, may be performed by the presence information request process 700, shown in FIG. 7, at the time of a presence query from a presence subscriber. Typically, there is a large number of aggregations that queries may request and thus pre-computing their values is likely to be wasteful if only a small subset of such aggregations is requested on a regular basis. If, however, a small known subset of aggregations is requested regularly, their values may be computed and cached at the times of the periodic recomputation of the $f_{u,s}$ values instead of performing on-demand computations of these aggregations. If the expected frequency of presence queries is small, an on-demand computation and caching can be performed of the $f_{u,s}$ values as well as of the aggregations.

FIG. 7 is a flow chart describing an exemplary implementation of a presence information request process 700. As shown in FIG. 7, the presence information request process 700 initially computes the presence function $f_{u,s}(d)$ for each presence source during step 710. Thereafter, the presence information request process 700 sorts the computed $f_{u,s}(d)$ functions during step 720 and then selects, during step 730, the first presence source in the sorted list as the presence source where user u is most likely to be present and available.

Proxy Presence

The presence of a user refers to the physical presence of the user at a device, application, computer or system, generally at a given time and in a certain location. The user presence is of interest as an indication of where a user is or was at a certain time, what activity the user is or was engaged in, and how to currently reach this user with a communication. The user is seen as an actor (in the sense of being active) and as a subject. However, the user can also be viewed as an object of business and personal processes in which application-dependent representations of the user are processed. For example, a user's loan application in a bank business process represents the user, and the bank business process is doing something to the user's representation in a loan application by processing it. The user behind that loan application becomes the object of the bank business process. In another example, the user's contact information and address might get added to an electronic address book by another user. The former user becomes the object of the latter user's personal process of adding somebody to the address book, and the former user's contact information and address constitute that user's representation from the point of view of this personal process.

In both examples, the user's representation is present in the process in question for as long as the process is working on the user's representation. This type of presence is referred to as proxy presence and the representation of the user becomes a proxy presence source. The beginning and end of a proxy presence interval, i.e., the macro proxy presence, of a user, as well as the micro proxy presence, has to be determined in an application-specific manner.

Proxy presence may be interesting to various proxy presence subscribers for a variety of reasons. The user himself might be interested in his loan application proxy presence. For example, a customer service branch of a bank could employ the proxy presence techniques described herein to notify the user when the bank business process begins and ends processing the loan application. The beginning and end of the loan application can be considered the user's macro proxy presence whereas each major step or event along the way in the loan processing can be considered a micro proxy presence event. An example of the latter is a review, access or update of the loan application by a loan officer, or when an appraisal is performed in conjunction with the loan application.

Similarly, in an insurance company, an insurance policy, such as a life, car, home or umbrella policy, can be considered as a proxy representation of the user. Since a policy is typically a long-lived proxy presence source, the macro presence interval may be defined as the time that passes between the beginning of an insurance process that operates on the policy and the end of this process. If the insurance process has an extended duration, micro proxy presence can be introduced for policies as events that touch upon the processing of the policy. For example, retrieving the policy and reviewing the clauses of the policy by a claims adjustor could be considered micro proxy presence events. A proxy presence subscriber may want to identify the 5% least "proxy present" users for a new marketing campaign. A different proxy presence subscriber might be interested in all currently proxy present users so that it can send status updates for these users' insurance policies.

Users might be curious about the proxy presence of their contact information in the electronic address books of friends or colleagues. The proxy presence subscriber client might periodically request a proxy presence update from the proxy presence server and notify the user when a friend has terminated his or her proxy presence.

The concepts of presence aging and fuzzy presence, as discussed above, apply to proxy presence sources under certain circumstances, as would be apparent to a person of ordinary skill in the art. Thus, the presence aging and fuzzy presence techniques described above can be employed to rank proxy presence events, originating at all proxy presence event sources, according to the timeliness of the proxy presence events.

As previously indicated, to determine real presence, presence agents 400 are deployed on or in conjunction with user devices 110, such as personal computers, mobile phones, or applications. To determine proxy presence, the applications and systems that contain user representations have to either contain proxy presence agents 400 as integral parts or they have to give proxy presence agents 400 access to proxy presence. In either implementation, the same options that apply to connecting real presence agents 400 to real presence servers 500 are valid for connecting proxy presence agents with proxy presence servers.

If an application or system does not contain proxy presence agents 400 as integral parts, access to external proxy presence agents 400 can be provided in many different ways. For example, access to external proxy presence agents can be provided (i) through databases, shared files, or shared memory, from which proxy presence agents 400 retrieve changes in proxy presence information (in the case of a database, the proxy presence agent 400 can be built around a database trigger that gets invoked when the content of a proxy presence table changes, as discussed below in conjunction with FIG. 8); (ii) by pushing proxy presence changes to proxy presence agents 400 via data connections, for example, by a node in a business workflow sending a notification of a proxy presence event to a proxy presence agent 400; or (iii) by allowing a proxy presence agent to periodically poll the application for proxy presence changes. For a detailed discussion of suitable techniques for adding such communication tasks to a workflow, see U.S. patent application Ser. No. 10/955,918, entitled "Method and Apparatus for Providing Communication Tasks in a Workflow," incorporated by reference herein.

If a proxy presence agent 400 is given access to complete knowledge of every user's proxy presence, fuzzy proxy presence is not a particularly meaningful concept, and discrete proxy presence states, such as "present" or "not present" can be employed. Otherwise, fuzzy proxy presence may be computed in analogy to fuzzy real presence.

FIG. 8 is a sample table for an exemplary database trigger database 800 that records one or more database triggers that can be used to report presence events to a proxy presence agent 400 of a user. The exemplary database triggers in the sample database 800 are based on the loan application example discussed above.

Such database triggers provide a mechanism for a service provider, such as a bank, to notify a proxy presence agent 400 of presence events, such as macropresence and micropresence events. The loan process is considered a proxy presence source, in the manner described above for real proxy events. Generally, as the service provider logs information in a database, one or more database triggers executing on the database server can monitor the recorded information for presence related information that should be reported to a proxy presence agent 400. A database trigger is typically comprised of three parts:

1. a description of triggering events, such as database inserts, updates, or deletes (for example, a triggering event may be that a given user's loan application record has been updated in the database);
2. one or more conditions that describe restrictions on the triggering events (the conditions must evaluate to TRUE to allow the trigger to proceed to part 3; for example, the conditions may require that the given user's loan application record in the database has a new entry in the "status" column that says either "accepted" or "rejected");
3. an action expressed as code (embodied, for example, as code in a database-centric programming language that can call external programs, such as a proxy presence agent 400 and send data to that external program; because database-centric programming languages are typically too restrictive to allow coding a proxy presence agent 400, the proxy presence agent 400 would typically be an external program rather than the trigger itself).

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method comprising:
    establishing, by a terminal, a data connection with a presence server at time $T_1$;
    transmitting, by the terminal, a macro-presence event to the presence server via the data connection;
    detecting, by the terminal, a first user input at time $T_2$, wherein the first user input is indicative of a first micro-presence event that is different from the macro-presence event, and wherein time $T_1$<time $T_2$;
    determining, by the terminal, whether the first micro-presence event falls within t time units of a prior micro-presence event recorded by the terminal;
    transmitting, by the terminal, the first micro presence event to the presence server in response to determining that the first micro-presence event fails to fall within t time units of the prior micro-presence event; and
    establishing, by the terminal, a communications session in response to a selection performed by the presence server, wherein the terminal is selected from a plurality of terminals based on the fact that a first value computed for the first micro-presence event has a greater presence and availability status than those values computed for the plurality of terminals.

2. The method of claim 1 further comprising:
    receiving, by the terminal, a signal from the presence server, wherein the signal is to prompt a user of the terminal to update the presence and availability status of the terminal; and
    prompting the user, by the terminal, to update the presence and availability status of the terminal in response to receiving the signal from the presence server; and
    transmitting, by the terminal, a second micro-presence event to the presence server in response to receiving a second user input after the terminal prompts the user.

3. The method of claim 1, further comprising:
    receiving, by the terminal, a second user input and a third user input;
    adjusting, by the terminal, in response to receiving the second user input, a continuous function to establish how available the user desires to be with respect to a first subscriber; and
    adjusting, by the terminal, in response to receiving the third user input, the continuous function to establish how available the user desires to be with respect to a second subscriber,
    wherein, as a result of adjusting the continuous function based on the second user input and the third user input, a first availability of the user with respect to the first subscriber differs from a second availability of the user with respect to the second subscriber.

4. The method of claim 1, wherein transmitting the macro-presence event includes transmitting a telephone number of the terminal to the presence server.

5. The method of claim 1, wherein the presence server selects the terminal from the plurality of terminals based on a ranking of the first value in an ordered list established by the presence server.

6. The method of claim 1, further comprising:
    computing, by the terminal, a second value using a continuous function;
    determining, by the terminal, whether the second value falls below a configurable threshold;
    prompting a user, by the terminal, to update the presence and availability status of the terminal after determining that the second value falls below the configurable threshold; and
    transmitting, by the terminal, a second micro-presence event to the presence server in response to receiving a second user input after the terminal prompts the user.

7. The method of claim 1, wherein the macro-presence event is at least one of a powering-on, a powering-down, and an inactive status of the terminal.

8. The method of claim 1, wherein transmitting the first micro-presence event from the terminal to the presence server includes transmitting an indication of a button press received at the terminal that invoked transmission of the first micro-presence event.

9. A method comprising:
    receiving, by a presence server, a respective micro-presence event from each of a plurality of sources associated with a user, wherein the presence server receives each respective micro-presence event from one of the plurality of sources at different times based on a temporal interval established by each source;
    in a first computation, computing a first value for each source based on their respective micro-presence event, wherein the first value is computed by the presence server using a continuous function;
    receiving, by the presence server, a query to determine which source in the plurality of sources has a greater likelihood to be available at time $T_1$ to establish a communications session;
    determining, by the presence sever, that a first source in the plurality of sources has a greater likelihood of being available at time $T_1$ based at least in part on the first value computed for each source;
    selecting, by the presence server, the first source in the plurality of sources based on the determination; and
    transmitting, by the presence server, a response to a subscriber indicating that the first source in the plurality of sources has the greater likelihood of being available at time $T_1$ to establish the communications session.

10. The method of claim 9, further comprising:
    ranking, by the presence server, each source in a list after the first computation, wherein the presence server ranks each source associated with the user in descending order based on the first value computed for each source.

11. The method of claim 10, wherein the presence server determines which source has the greater likelihood to be available at time $T_1$ based on the list, and wherein selecting the first source in the plurality of sources is based on where the first value ranks in the list.

12. The method of claim 9, wherein the presence server re-computes the continuous function for each source on a continuous scale to obtain a current level of presence and availability of the user at each source.

13. The method of claim 9, further comprising:
computing, by the presence server, at least one of an average and a weighted average for the plurality of sources using the continuous function, and wherein the at least one of the average and the weighted average of the plurality of sources enables the subscriber to discern an overall presence of the user.

14. The method of claim 9, further comprising:
storing, by the presence server, a plurality of timestamps, wherein each timestamp of the plurality of timestamps is associated with a corresponding micro-presence event that is received from each source in the plurality of sources.

15. The method of claim 9, further comprising:
receiving, by the presence server, an indication of a user input that invoked each source to transmit their respective micro-presence event, and wherein the user input transmitted by each source is indicative of a particular type of user input.

16. The method of claim 9, further comprising:
establishing at different times, by the presence server, a data connection with each source of the plurality of sources, wherein the data connection is established before receiving the respective micro-presence event from each source; and
receiving, by the presence server, a macro-presence event from each source via the data connection, and wherein the macro-presence event and the respective micro-presence event are different presence events.

17. The method of claim 9, further comprising:
re-computing, by the presence server, a second value for the first source in the plurality of sources using the continuous function;
determining, by the presence server, whether the second value computed for the first source falls below a threshold;
transmitting, by the presence server, a signal to a presence agent of the first source in response to determining that the second value falls below the threshold;
wherein the signal is to prompt the user to update a presence status of the first source through user interaction with the first source.

18. The method of claim 9, further comprising:
determining, by the presence server, whether the time in which the first computation of the continuous function for each source exceeds a threshold; and
re-computing, by the presence server, a second value for each source using the continuous function;
wherein the re-computation is in response to the presence server determining that the time of the first computation performed for each source exceeds the threshold.

19. A terminal comprising:
a memory; and
a processor, coupled to the memory, operative to:
establish a data connection with a presence server at time $T_1$;
transmit a macro-presence event to the presence server via the data connection;
detect a first user input at time $T_2$, wherein the first user input is indicative of a first micro-presence event that is different from the macro-presence event, and wherein time $T_1 <$ time $T_2$;
determine whether the first micro-presence event falls within t time units of a prior micro-presence event recorded by the terminal;
transmit the first micro presence event to the presence server in response to determining that the first micro-presence event fails to fall within t time units of the prior micro-presence event; and
establish a communications session in response to a selection performed by the presence server, wherein the terminal is selected from a plurality of terminals based on the fact that a first value computed for the first micro-presence event has a greater presence and availability status than those values computed for the plurality of terminals.

20. The terminal of claim 19, wherein the processor is further configured to:
receive a signal from the presence server, wherein the signal is to prompt a user of the terminal to update the presence and availability status of the terminal; and
prompt the user to update the presence and availability status of the terminal in response to receiving the signal from the presence server; and
transmit a second micro-presence event to the presence server in response to receiving a second user input after the user is prompted.

21. The terminal of claim 19, wherein the processor is further configured to:
receive a second user input and a third user input;
adjust, in response to receiving the second user input, a continuous function to establish how available the user desires to be with respect to a first subscriber; and
adjust, in response to receiving the third user input, the continuous function to establish how available the user desires to be with respect to a second subscriber;
wherein, as a result of adjusting the continuous function based on the second user input and the third user input, the availability of the user with respect to the first subscriber is different than the availability of the user with respect to the second subscriber.

22. The terminal of claim 19, wherein transmitting the macro-presence event includes transmitting a telephone number of the terminal via the data connection established with the presence server.

23. The terminal of claim 19, wherein selecting the terminal from the plurality of terminals by the presence server is also based on the fact that the first value computed for the first micro-presence event is ranked first in an ordered list established by the presence server.

24. The terminal of claim 19, wherein the processor is further configured to:
compute a second value using the continuous function;
determine whether the second value falls below a configurable threshold;
prompt a user to update the presence and availability status of the terminal after determining that the second value falls below the configurable threshold; and
transmit a second micro-presence event to the presence server in response to receiving a second user input after the user is prompted.

25. The terminal of claim 19, wherein the macro-presence event is at least one of a powering-on, a powering-down, and an inactive status of the terminal.

26. The terminal of claim 19, wherein
transmitting the first micro-presence to the presence server includes transmitting an indication of a button press received at the terminal that invoked the transmission of the first micro-presence event.

27. An article of manufacturer comprising a recordable medium containing instructions, which when executed by a processor, cause the processor to perform steps comprising:
establishing a data connection with a presence server at time $T_1$;
transmitting a macro-presence event to the presence server via the data connection;
detecting a first user input at time $T_2$, wherein the first user input is indicative of a first micro-presence event that is different from the macro-presence event, and wherein time $T_1$<time $T_2$;
determining whether the first micro-presence event falls within t time units of a prior micro-presence event recorded by the terminal;
transmitting, by the terminal, the first micro presence event to the presence server in response to determining that the first micro-presence event fails to fall within t time units of the prior micro-presence event; and
establishing a communications session in response to a selection performed by the presence server, wherein the terminal is selected from a plurality of terminals based on the fact that a first value computed for the first micro-presence event has a greater presence and availability status than those values computed for the plurality of terminals.

* * * * *

UNITED STATES PATENT AND TRADEMARK OFFICE
CERTIFICATE OF CORRECTION

| | | |
|---|---|---|
| PATENT NO. | : 8,176,086 B2 | Page 1 of 1 |
| APPLICATION NO. | : 10/999901 | |
| DATED | : May 8, 2012 | |
| INVENTOR(S) | : John et al. | |

It is certified that error appears in the above-identified patent and that said Letters Patent is hereby corrected as shown below:

In the Claims:

Column 13, Claim 1, line 47, change "a greater presence and availability status" to --a presence and availability status greater--.

Column 15, Claim 18, line 53, change "the time" to --a time--.

Column 15, Claim 18, line 58, change "re-computation" to --re-computing--.

Column 16, Claim 19, line 16, change "a greater presence and availability status" to --a presence and availability status greater--.

Column 16, Claim 21, line 35, change "the user" to --a user--.

Signed and Sealed this
Twenty-fifth Day of February, 2014

Michelle K. Lee
*Deputy Director of the United States Patent and Trademark Office*